United States Patent [19]

Laskey

[11] 4,080,476
[45] Mar. 21, 1978

[54] ANTI-FOG COATED OPTICAL SUBSTRATES

[75] Inventor: Richard A. Laskey, Washington, N.J.

[73] Assignee: Datascope Corporation, Paramus, N.J.

[21] Appl. No.: 742,107

[22] Filed: Nov. 15, 1976

[51] Int. Cl.$^2$ .......................... G02D 1/10; B05D 5/06
[52] U.S. Cl. ....................................... 428/413; 427/2; 427/54; 427/164; 427/165; 428/412; 428/417; 428/429; 428/432; 428/436; 428/441; 428/515
[58] Field of Search ..................... 427/164, 165, 2, 54; 428/412, 413, 429, 432, 436, 441, 417, 515

[56] References Cited

U.S. PATENT DOCUMENTS

| 3,700,487 | 10/1972 | Crandon et al. | 428/412 |
|---|---|---|---|
| 3,726,703 | 4/1973 | Dornte | 428/413 X |
| 3,865,619 | 2/1975 | Pennewiss et al. | 427/164 X |

*Primary Examiner*—James R. Hoffman
*Attorney, Agent, or Firm*—Steinberg & Blake

[57] ABSTRACT

The surface of optical substrate are coated with a polymerized monomer of the formula:

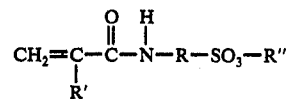

wherein R is selected from the group consisting of straight and branched alkane or alkylene of up to 10 carbon atoms, R' is selected from the group consisting of hydrogen and lower alkyl, and R" is a monovalent cation. The polymer may be linear, an interpolymer, or a cross linked polymer. The polymeric coating is capable of permitting steam, fog, water vapor, etc. to permeate its matrix and render the coated optical substrate anti-fog when subjected to such conditions.

17 Claims, No Drawings

ANTI-FOG COATED OPTICAL SUBSTRATES

BACKGROUND OF THE INVENTION

The fogging of optical substrates such as glass and the like has been a persistent nuisance. This fogging phenomena is not only a nuisance, but is actually dangerous when the fogging occurs on substrates such as automobile windows, medical mirrors, medical operating room equipment, etc., due to lack of vision.

Known anti-fog coatings include oil coatings, polymers of glycol-methacrylates and acrylates and polyacrylamides. The oil only left an undesirable film which is difficult to remove, and the known polymers were unable to provide a consistent long lasting anti-fog coating.

There has thus been a constant need for the development of new and more effective anti-fog coatings which are not only more effective for a short period of time, but which remain more effective over a long period of time and under the most adverse conditions. In order for such coatings to be truly effective it is apparent that the same must be optically clear, undetectable, and must provide no visual distortion. In addition the coating must be easy to apply by conventional methods and in the case of the use thereof for medical applications such as dental mirrors, surgical mirrors, etc., the coating must be non-toxic and biocompatible.

SUMMARY OF THE INVENTION

Generally speaking, in accordance with the present invention at least one surface of an optical substrate is coated with a polymerized monomer of the formula:

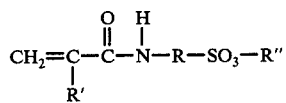

wherein R is selected from the group consisting of straight and branched alkane or alkylene of up to 10 carbon atoms, R' is selected from the group consisting of hydrogen and lower alkyl, and R" is a monovalent cation.

The polymer may be a linear polymer of the above monomer or an interpolymer thereof with, for example, an epoxide, a vinyl monomer, a melamine, etc. In addition, the above polymer may be a cross linked polymer cross linked by a monomer such as ethylene dimethacrylate, etc., e.g. a cross linked polymer of the type set forth in my U.S. Pat. No. 3,929,741.

The invention is applicable to the coating of any optical substrate, whether glass, plastic, etc., whether transparent, translucent, or reflecting, including, but not limited to automobile windows, mirrors of all types such as medical mirrors, dental mirrors, surgical mirrors, medical operating room equipment, instruments and gauges, microscopes, telescopes, camera lenses, prisms, picture coverings, microscope slides, reading glasses, sun glasses, lenses of all types, sport and skiing goggles, greenhouses, gas mask face plates, house windows, airplane windows, train and automobile windows, etc.

The coatings of the present invention are applied by any conventional method such as spraying, dipping, rolling, coating, printing, etc.

The modified linear acrylamido polymers, interpolymers and cross polymers thereof when applied to optical substrates of all type have the effect of preventing the formation of haze on the surface and to thus render the substrate anti-fog.

The linear polymers are soluble in water and alcohols for ease of application and after application the polymeric coating can be removed by excessive amounts of water or alcohol.

The interpolymers are applied by using the acrylamido monomer, the interpolymer-forming monomer and solvent. The cross linked, three dimensional acrylamido polymers are applied by using the acrylamido monomer, a cross linking agent and solvent. The mixture is excited to polymerization by free radical cayalyst, redox cayalyst, ultra-violet irradiation, microwave and thermal techniques.

The ability of the polymeric coatings of the present invention to ingurgitate more than 150 times its original weight of water and still maintain its physical shape and clarity is a considerable advantage over existing anti-fog coatings. The coating is not attacked by most of the common organic solvents and has excellent chemical stability. After ingurgitating the large quantities of water, the acrylamido polymeric coatings of the invention remain optically clear and colorless.

In the formula of the monomers given above which are polymerized either linearly, interlinearly or cross linked for use in accordance with the present invention, the substituent R" as indicated is a monovalent cation, including the most common monovalent cation such as hydrogen, sodium, potassium, ammonium, etc.

The linear polymeric coatings of the present invention will thus have the following general formula:

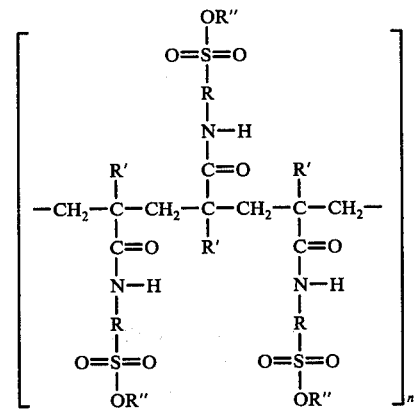

where R, R' and R" have the same definitions as above, and wherein $n$ has a value of between 1000 and 100,000, which corresponds to the degree of polymerization.

The most preferred anti-fog polymers according to the present invention is obtained by polymerizing 2-acrylamido-2-methylpropane-sulfonic acid. The resulting linear anti-fog polymer has the following formula:

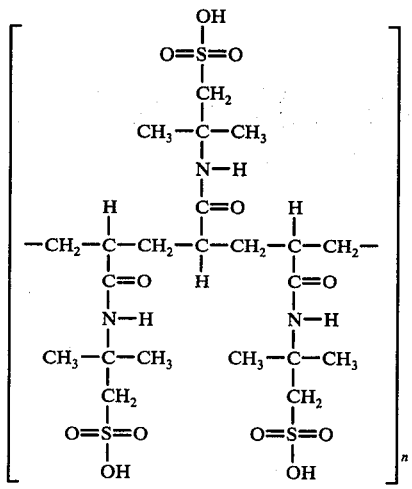

The cross linked polymer is formed by cross linking the polymerized monomer such as 2-acrylamido-2-methylpropane sulfonic acid by means of a cross linking agent such as ethylene dimethacrylate. The resulting cross linked polymer has the following structural formula:

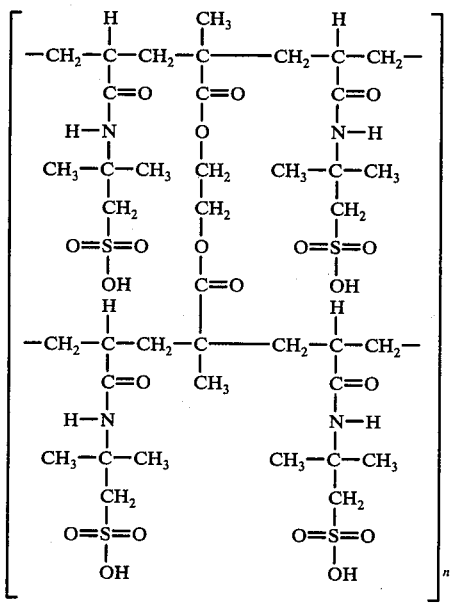

The hydrophilic, anti-fog polymers of the present invention have the property of being able to ingurgitate large quantities of aqueous liquid, fog, mist, water, etc. without adversely affecting the optical properties. It is well known that the existing glycol esters of methacrylic and acrylic acid can only retain 20 to 97% of aqueous liquid, and that at more than 50% liquid the glycol methacrylates become opaque and of no optical value. The polymers of the present invention can retain amounts as high as more than 400 times its own weight of water.

The nomenclature "polymer" in referring to the hydrophilic, anti-fog polymers of the present invention is used in a general sense to include not only homopolymers and cross-linked homopolymers but co-polymers, ter-polymers, and other inter interpolymers including grafted polymers and polymer blends.

Numerous different types of co-monomers can be used to form interpolymers, including the following types of monomers: esters of unsaturated polyhydric alcohols, vinyl cyclic compounds, unsaturated acids and anhydrides, unsaturated nitriles, unsaturated amines, vinyl halides, unsaturated ketones, unsaturated ethers, unsaturated esters, unsaturated functional silanes, alkyl methacrylates, other vinyl monomers epoxides and melamines.

Examples of cross-linking monomers are olefin glycol diacrylates and dimethacrylates such as: ethylene dimethacrylate, diethylene glycol dimentacrylate, neopentyl glycol diacrylate and other diacrylates and dimethacrylates. diallyl phthalate and other di-, tri-, and tetra functional $CH_2 = C -$ group monomers, epoxides and malamines may be used.

The polymerization of 2-acrylamido-2-methylpropane sulfonic acid is initiated by free radical catalyst, water, redox systems, Ziegler type catalysts, ultra violet, microwave and thermal techniques.

Examples of suitable catalysts are benzoyl peroxide, di (isopropyl) peroxydicarbonate, t-butyl peroctoate, bis (4-t-butylcyclohexyl)peroxydicarbonate, isopropyl peroctoate, and other free radical catalysts.

The herein mentioned compounds are just examples and the invention is not meant to be limited to these examples.

Therefore, included in this patent are numerous chromium complex reagents and compounds to form cross-linked acrylamido polymers having the following general structure:

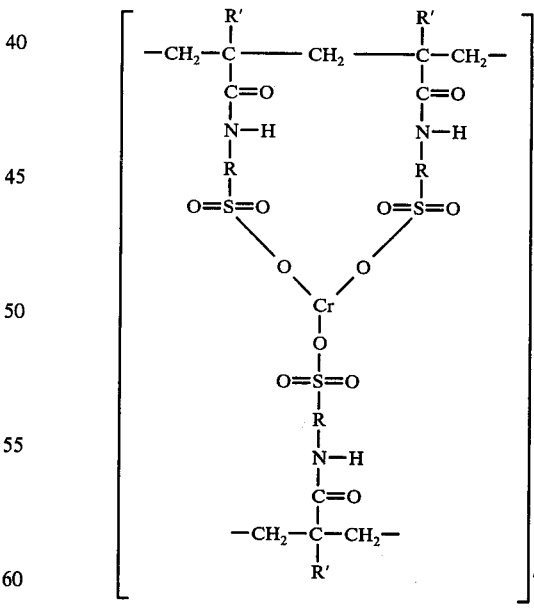

wherein R is straight or branched, alkane or alkylene, of up to 10 carbons and R' is hydrogen or lower alkyl. It is the intent to include all other monomers which possess groups (e.g. $[SO_3]^-$, $[OH]^-$, etc.) that combine with chromium and will also polymerize (Homo, Co, Ter) to form a cross-linked polymer.

DESCRIPTION OF PREFERRED EMBODIMENTS

The following examples are given to illustrate the present invention. The scope of the invention is not to be limited to the specific details thereof.

EXAMPLE I

In a beaker, 5 grams of 2-acrylamido-2-methyl propane sulfonic acid are mixed with 4 cc of 4% ammonium persulfate in water. The mixture is mixed until all of the 2-acrylamido-2-methyl propane sulfonic acid is dissolved. The solution is placed under vacuum to remove all air, and nitrogen is bubbled through the solution. The monomer solution is exposed to ultra-violet irradiation or heat, if necessary, for 10 minutes or until polymerization is initiated. The polymerizing mass is left at ambient temperature for 1 hour to assure complete polymerization. The polymer is removed from the beaker, sectioned, and allowed to air dry at ambient temperature, or oven dried at 60° C.

A one percent (1%) solution of the dry acrylamido polymer in methanol or higher alcohol (e.g. ethanol), is made up, although a 0.5 – 20% solution could be used. A clean dental mirror and a clean glass microscope slide are dipped into the solution and allowed to dry; ultra-violet irradiation exposure assures a cured film. A laboratory steam generator is set up 10 centimeters from the test material and the acrylamido film is exposed to a jet of steam. Exposed was (1) dental mirror with linear acrylamido polymer coating (2) dental mirror, uncoated control; (3) glass microscope slide with linear acrylamido polymeric coating; (4) glass microscope slide, uncoated control; results are as follows:

| Test Material | Immediate Exposure | After 1 Hr. | After 10 Hrs. |
| --- | --- | --- | --- |
| Dental Mirror - Polymeric Coating | No Fogging-Clear | No Fogging-Clear | No Fogging-Clear |
| Dental Mirror - Uncoated Control | Fogged- (A) | Fogged- (A) | Fogged- (A) |
| Microscope Glass Slide - Polymer Coating | No Fogging Clear | No Fogging-Clear | No Fogging Clear |
| Microscope Glass Slide - Uncoated Control | Fogged- (B) | Fogged- (B) | Fogged- (B) |

(A) Could not see any reflection due to fogging
(B) Could not see through the glass due to fogging An alcohol soluble linear acrylamido polymer coating proved to be anti-fog when applied to glass.

EXAMPLE II

Same as Example I, except distilled water is used to make up the one percent (1%) acrylamido polymer solution. The same type items (dental mirror and glass slide) were coated. Drying time is extended due to the evaporation rate compared to that of alcohol. Although similar films were obtained using water as a safe, non-toxic solvent, the test was conducted using the same technique in Example I and results were identical. A water-soluble linear acrylamido polymer proved to be anti-fog when applied to glass.

EXAMPLE III

Same as Examples I and II, except applied to clear plastics such as polymethylmethacrylate (e.g. Plexiglass ®, Lucite ®), and polycarbonate (e.g. Lexan ®) and polypropinate. The same tests were conducted using the test technique described in Example I; results were the same. An alcohol and water soluble linear acrylamido polymer proved to be anti-fog when applied to synthetic plastics.

EXAMPLE IV

Into a beaker, 5 grams 2-acrylamido-2-methyl propane sulfonic acid, 5 cc of 4% ammonium persulfate in water, and 0.014 grams of ethylene dimethacrylate in 0.5 cc of methyl alcohol are mixed until totally soluble and homogeneous. The monomer solution is placed in a vacuum to remove entrapped air, and nitrogen is bubbled through the solution. The solution was coated on clear glass and cured under ultra-violet for 5 to 10 minutes. The polymeric coated glass was tested using the aforementioned laboratory steam generator. The acrylamido polymer coated glass prevented fogging of the glass. A cross-linked, three-dimensional acrylamido polymer proved to be anti-fog when applied to glass.

EXAMPLE V

Repeat of Example IV, except coated onto clear polystyrene in place of glass, tested in the same manner, and obtaining the same results. A cross-linked, three-dimensional acrylamido polymer proved anti-fog when applied to a synthetic plastic.

EXAMPLE VI 0.5 Grams of methyl methacrylate is mixed in 1 cc of methyl alcohol and added to 4 cc of aqueous solution containing 4% ammonium persulfate and 4.5 grams 2-acrylamido-2-methyl propane sulfonic acid. The monomeric mixture is thoroughly mixed, vacuum de-aired, and nitrogen is bubbled through the solution. The solution is exposed to ultra-violet irradiation for 15 minutes or until polymerized. The polymer is removed, sectioned and air-dried at ambient temperature, or oven-dried at 60° C. A 1% acrylamido/methacrylate co-polymer solution in methyl alcohol or higher alcohol (e.g. ethyl alcohol) or either suitable solvent was coated on glass and air dried under ultraviolet rays for 10 minutes or until dry. The coating was clear and colorless and when exposed to steam from the laboratory steam generator, the acrylamido co-polymer coating remained clear. Co-polymers of the linear acrylamido type have anti-fog properties.

EXAMPLE VII

3 Grams of 2-acrylamido-2-methyl propane sulfonic acid are dissolved in 3 cc of 4% ammonium persulfate in water. 2 grams of ethoxyethyl acrylate in 2 cc methyl alcohol or higher alcohol (e.g. ethyl alcohol) is added to the aforementioned solution and mixed until a homogeneous solution. The solution is placed under vacuum to de-air and nitrogen is bubbled through the solution. The solution is exposed to ultra-violet irradiation for 15 minutes or until polymerized. The co-polymer is removed, cut-up, and air-dried at ambien temperature. The acrylamido/acrylate co-polymer was dissolved in methyl alcohol or higher alcohol (e.g. ethyl alcohol) or other suitable solvent to a 1% polymer concentration. This solution was applied to a dental mirror, air-dried and exposed to ultra-violet rays. The co-polymer coating was tested for anti-fog properties using the laboratory steam generator and proved anti-fog. Linear co-polymers of acrylamido polymers have anti-fog properties.

EXAMPLE VIII

1 Gram of 2-hydroxyethyl methacrylate and 1 gram methyl methacrylate are mixed with 2 cc methyl alcohol or higher alcohol (e.g. ethyl alcohol). A solution of 3 grams 2-acrylamido-2-methyl propane sulfonic acid in 3 cc of 4% ammonium persulfate in water are mixed with the first solution. This composite mixture is vacuum de-aired and nitrogen is bubbled through the solution. The solution is placed under ultra-violet or heated for 15 minutes or until polymerized. A 1% solution in methanol, ethanol or other suitable solvents of the ter-polymer is coated on a dental mirror. The coating is allowed to air dry at ambient temperature and exposed to ultra-violet rays. The ter-polymer coating was found not to fog when in contact with steam. Linear ter-polymers containing an acrylamido group are found to have anti-fog properties.

EXAMPLE IX

25 Grams of methyl methacrylate, 25 grams of 2-acrylamido-2-methyl propane sulfonic acid, 0.03 grams T-butyl peroctoate and 140 cc of isopropyl alcohol are charged into a 250 ml flask, fitted with a reflux condenser, thermometer, and stirrer, and placed in a hot water bath. It is reacted for 14 hours at reflux temperature (86° C) with a nitrogen blanket. Add 5cc of water to clear reaction mixture and 0.2 of T-butyl peroctoate during reaction. After the 14 hour polymerization time, 95 cc of solvent were distilled off. A film was coated on a glass slide and was clear, colorless and anti-fog.

EXAMPLE X 0.2 Grams of bis (4-T-butylcyclohexyl) butylcyclohexyl) peroxydicarbonate, 20 grams of 2-acrylamido-2-methyl propane sulfonic acid, 20 grams of methyl methacrylate, 10 grams of 2-hydroxyethyl acrylate and 150 cc of isopropyl alcohol are mixed in a 250 ml flask fitted with a reflux condenser, thermometer and are placed in a hot water bath. The mixture was reacted for 18 hours at reflux temperature (86° C) during which time 5 cc of water was added due to turbid reaction mixture and 0.1 gram of bis (4-T-butylcyclohexyl) peroxydicarbonate. After the 18 hour reaction time, 40 cc of solvent were removed by distillation. A film was coated on a glass slide and was clear, colorless and found to be anti-fog.

EXAMPLE XI

Gamma - aminopropyltriethoxy silane is diluted by adding slowly to rapidly stirring water to the following percents: 2% (49 grams $H_2O$, 1 gram silane), 5% (47.5 grams $H_2O$, 2.5 grams silane), 10% (45 grams $H_2O$), 5 grams silane) and 20% (40 grams $H_2O$, 10 grams silane). Each dilution is coated on a separate glass plate and allowed to air dry at ambient temperature. Each glass plate was coated with a 1% linear acrylamido polymer as described in Example I, except dissolved in 70% ethyl alcohol. The coated glass plates were air dried, ultra-violet exposed(15 minutes) and oven cured at 60° C for 20 minutes to form an optically clear film. All of the coated glass plates were tested for fogging using the laboratory steam generator. The linear acrylamido polymer on a gamma-aminopropyltriethoxy silane film (of 2–10% coating solution) coupled to glass was anti-fog.

EXAMPLE XII

Vinyl triethoxysilane is diluted to 1% (24.5 grams methanol, 0.25 grams silane), 2% (24.50 grams methanol, 0.5 grams silane) and 5% (23.75 grams methanol, 1.25 silane) by slowly adding to stirring methanol. Each dilution is coated on a separate glass plate and air dried at ambient temperature. A layer of 1% linear acrylamido polymer (Example I) in seventy percent ethyl alcohol is air dried, ultra-violet exposed (15 minutes) and oven cured at 60° C for 30 minutes to form an optically clear film. All of the polymer/silane coated glass plates were exposed to steam. The linear acrylamido polymer coupled to a glass substrate using vinyl triethoxysilane (at a 1–5% coating solution) was anti-fog.

EXAMPLE XIII

Gamma-aminopropyltriethoxy silane is diluted slowly to rapidly stirring distilled water. The dilutions were 1% (24.75 grams of $H_2O$, 0.25 grams of silane), 2% (49 grams of $H_2O$), 1.0 gram of silane) and 5% (47.5 grams of $H_2O$, 2.5 grams of silane). Each dilution is coated on a separate 75 mm × 50 mm glass slide and dried.

5 grams of 2-acrylamido-2-methyl propane sulfonic acid are mixed with 4 cc of 4% ammonium persulfate in water. The mixture is mixed in a beaker until solution is homogeneous. The acrylamido monomer solution is exposed to ultraviolet or heat (60° C) for 10 minutes or until polymerization is commenced. The polymerization is continued for 1 hour at ambient temperature for complete polymerization. The polymer is removed, sectioned, and allowed to dry at ambient temperature. A one percent solution of the dry acrylamido polymer in methanol (or higher alcohol; ethanol) is made up. Using 5cc of the 1% acrylamido polymer solution, 0.032 grams of a 20% ammonium dichromate in water solution are added. Each of the silane coated glass slides were top coated with acrylamido/dichromate solution. The solution was allowed to air dry and exposed to strong ultra-violet light to promote cross-linking and render the film insoluble. The ionic ($Cr+++$) cross-linked acrylamido polymer on silane coupled to glass was tested with a laboratory steam generator and found to be anti-fog and optically clear.

EXAMPLE XIV 0.5% (24.875 Grams methanol, 0.125 grams silane) and 1.0% (24.75 grams methanol, 0.25 grams silane) dilutions of vinyl triethoxysilane in methanol are made and coated on separate 75 mm × 50 mm glass slides. The silane coated glass slides are allowed to dry at room temperature.

The 1% acrylamido/dichromate solution made up in Example XIII is coated, dried and cured as in Example XIII. The coating was optically clear. The ionic ($Cr+++$) cross-linked acrylamido polymer coated on silane coupled to glass proved to be anti-fog when exposed to steam.

EXAMPLE XV (A) Gamma-aminopropyltriethoxy silane is diluted to 0.5% (24.875 grams $H_2O$, 0.125 grams silane). 3 cc of the diluted silane are mixed with 3 cc of 1% linear poly 2-acrylamido-2-methyl propane sulfonic acid (Example I) in ethyl alcohol. The mixture is coated on a glass slide, air dried, exposed to ultra-violet rays and cured in an oven at 60° C. The cured acrylamido/silane coating on the glass is 33.3% silane and 66.7% acrylamido polymer. When exposed to steam, the polymeric coating exhibited anti-fog properties.

(B) Gamma-aminopropyltriethoxy silane is diluted to 1% (24.75 grams H$_2$O, 0.25 grams silane). 1 cc of the 1% silane solution is mixed with 1 cc of 1% linear poly 2-acrylamido-2-methyl propane sulfonic acid (Example I) in 70% ethyl alcohol. The acrylamido/silane mixture is coated on a glass slide, air dried, exposed to ultra-violet irradiation and cured in an oven at 60° C. The acrylamido/silane coating on the glass is 50% acrylamido and 50% silane polymer.

(C) Vinyltris-silane is diluted to 0.5% (24.875 grams H$_2$O, 0.125 grams silane) in distilled water. 3 cc of the diluted silane is added to 3 cc of 1% linear 2-acrylamido-2-methyl propane sulfonic acid (Example I) and coated on a glass slide, air dried, ultra-violet exposed and cured in an oven at 60° C. The polymeric coated glass slide is 33.3% silane and 66.7% acrylamido polymer. The acrylamido/silane coating proved non-fogging when exposed to steam.

(D) Vinyltris-silane is diluted to 0.5% (24.875 grams H$_2$O, 0.125 grams silane) in distilled water. 2 cc of the diluted silane are added to 4 cc of 1% linear 2-acrylamido-2-methyl propane sulfonic acid (Example I) and coated on a 75 mm × 50 mm glass slide, air dried at ambient temperature, exposed to ultra-violet irradiation and oven cured at 60° C. The acrylamido/silane polymer coated glass is 20% silane and 80% acrylamido polymer. The acrylamido/silane coating was exposed to steam from the laboratory steam generator. The acrylamido/silane coating was anti-fog.

EXAMPLE XVI (A) 0.5% gamma-aminopropyltriethoxy silane in methyl alcohol is prepared using 24.875 grams of methyl alcohol and 0.125 grams silane. 5 cc of silane solution are mixed with 5 cc of 1% linear acrylamido polymer (Example I) solution in methyl alcohol containing 0.32 grams of 20% ammonium dichromate in water. The mixture is coated on a 75 mm × 50 mm glass slide, air dried at ambient temperature and irradiated with ultra-violet rays to cure. The cross-linked acrylamido/silane polymer coating is tested with a steam generator. The cross-linked 33.3% silane to 66.7% acrylamido polymer coating proved to be anti-fog.

(B) 5 cc of a one percent solution of vinyl triethoxy silane (24.75 grams of methanol and 0.25 grams silane) are mixed with 5 cc of 1% linear acrylamido polymer (Example I) in methyl alcohol containing 0.32 grams of 20% ammonium dichromate in water. The mixture is coated on glass, allowed to air dry and exposed to ultra-violet rays to cure. The 50% silane to 50% acrylamido cross-linked polymer coated on glass is tested with steam. The cross-linked silane/acrylamido polymer has anti-fog properties.

(C) 5 cc of a 0.5% solution of vinyltris-silane (24.875 grams distilled water and 0.125 grams silane) is mixed with 5 cc of 1% linear acrylamido polymer (Example I) in methyl alcohol containing 0.32 grams of 20% ammonium dichromate in water. The mixture is coated on a 75 mm × 50 mm glass slide and allowed to air dry at ambient temperature. The coated slide is exposed to ultra-violet rays to cure. The 33.3% silane to 66.7% acrylamido cross-linked polymer is found to be non-fogging when exposed to steam.

EXAMPLE XVII

3 Grams of 2-acrylamido-2-methyl propane sulfonic acid, 2 cc of gamma-aminopropyltriethoxy silane and 4 cc of 4% ammonium persulfate in distilled water are dissolved and mixed together in a beaker. The solution is vacuum de-aired and nitrogen is bubbled into the homogeneous solution, followed by the solution being irradiated with ultra-violet rays until polymerized. The polymer is removed, severed into pieces and air dried at ambient temperature. A clear co-polymer is formed which is insoluble in methyl alcohol.

A one percent solution of the acrylamido/silane in distilled water is prepared for coating. A 75 mm × 50 mm glass slide is coated with the linear acrylamido/silane co-polymer solution and air dried on glass. The co-polymer coated glass was exposed to steam using a laboratory steam generator. The linear acrylamido/silane co-polymer coating proved anti-fog.

EXAMPLE XVIII

In a beaker, 3 grams of 2-acrylamido-2-methyl propane sulfonic acid, 4cc of 4% ammonium persulfate in distilled water and 2 cc of gamma-aminopropyltriethoxy silane are mixed until totally dissolved. The solution is placed under vacuum to remove air and nitrogen is bubbled through the solution. The solution is exposed to ultra-violet irradiation until polymerized. The polymer is removed, sectioned and air dried at room temperature. The co-polymer is clear and insoluble in methyl alcohol.

5 cc of a 1% solution of the co-polymer in distilled water are mixed with 0.032 grams of 20% ammonium dichromate (in distilled water). The solution is coated on a glass slide and allowed to air dry at ambient temperature. The coating is exposed to ultra-violet rays to cross-link and cure. The cross-linked acrylamido/silane co-polymer coating is exposed to steam and does not fog. The cross-linked acrylamido/silane co-polymer coupled to glass is a non-fogging coating.

EXAMPLE XIX

The following mixtures are made-up in separate beakers:

(A) 0.5% gamma-aminopropyltreithoxy silane (24.875 grams H$_2$O, 0.125 grams silane)
(B) 0.5% vinyl triethoxysilane (24.875 grams methyl alcohol, 0.125 grams silane)
(C) 1% vinyl triethoxysilane (24.75 grams methyl alcohol, 0.25 grams silane)
(D) 0.5% vinyl tris-silane (24.875 grams H$_2$O, 0.125 grams silane)

Each of the above solutions are coated on separate glass slides and allowed to air dry at room temperature. 5 grams of 2-acrylamido-2-methyl propane sulfonic acid are mixed with 10 cc of 4% ammonium persulfate in distilled water. The four silane coated glass slides are each top coated using strong ultra-violet irradiation. All four of the silane coated slides, top coated with linear acrylamido polymer were subjected to steam. All four of the coatings were non-fogging coatings.

EXAMPLE XX

Methacrylato chromic chloride is diluted to 1.6% in water, 5 grams methacrylato chromic chloride in 300 grams distilled water. 95 grams of the solution are neutralized with 22.5 grams of 1 percent ammonium hydroxide to a ph-6.0.

0.5 Grams of the neutralized methacrylato chromic chloride is added to 0.028 grams ethylene dimethacrylate in 0.5 cc methyl alcohol, 5 cc of 4% ammonium persulfate in distilled water and 5 grams of 2-acrylamido-2-methyl propane sulfonic acid in 10 cc of distilled water containing 1 gram of sodium hydroxide. The complete reaction mixture is mixed until all reagents are completely dissolved and a homogeneous solution is obtained.

The solution is coated on (1) Pyrex ® glass and (2) polystyrene. The two coated substances are exposed to strong ultra-violet rays. Both coatings were clear and non-fogging when exposed to steam. Acrylamido polymer, cross linked with both a di-vinyl compound and an ionic chromic compound is anti-fog on both glass and synthetic plastic.

EXAMPLE XXI

3 Grams of 2-acrylamido-2-methyl propane sulfonic acid, 1 gram of methyl methacrylate, 0.014 grams ethylene dimethacrylate in 2 cc of methanol and 4.5 cc of 4% ammonium persulfate in distilled water. The mixture is de-aired by vacuum and nitrogen is bubbled through the mixture. The solution is coated on a glass 75 mm × 50 mm slide and irradiated with strong ultra-violet rays to initiate a thin film polymerization. A slight haze on the surface is washed with distilled water. The coated glass slide is placed in an oven at 60° C for curing. The cross-linked acrylamido ter-polymer is clear and anti-fog when exposed to steam.

EXAMPLE XXII

In a beaker, 3 grams of 2-acrylamido-2-methyl propane sulfonic acid are dissolved in 4.5 cc of 4% ammonium persulfate in distilled water. Add 2 grams ethoxyethyl acrylate and 0.014 grams ethylene dimethacrylate dissolved in 2 cc methyl alcohol. The solution is mixed well, vacuum de-aired and nitrogen is bubbled through the solution. The co-monomer solution is coated on polystyrene and polymerization to a thin film is initiated by ultra-violet irradiation. The co-monomer was also coated on glass and initiated by ultra-violet rays. Both glass and polystyrene coated with acrylamido/acrylate cross-linked polymer were non-fogging when exposed to steam. Acrylamido/acrylate cross-linked polymer coated on glass or synthetic plastic is anti-fog.

EXAMPLE XXIII

Monomer solution: 1 gram of sodium hydroxide in 20 cc of distilled water, 5 grams of 2-acrylamido-2-methyl propane sulfonic acid and 5 cc of 4% ammonium persulfate in distilled water are mixed, vacuum de-aired, and nitrogen is bubbled through the solution.

(A) The monomer solution is coated on a glass slide and irradiated with ultra-violet rays to initiate reaction. The linear acrylamido sodium salt polymer was exposed to steam and proved to be non-fogging.

(B) The monomer solution was placed in a test tube, ultra-violet initiated and polymerized. The polymer is removed, cut-up, and dried at ambient temperature. A 1% solution in methyl alcohol is prepared and coated on a glass slide. The polymer film is cured by ultra-violet and oven cured at 60° C. The film, on glass, composed on a linear acrylamido sodium salt polymer is found to be anti-fog when exposed to steam.

(C) Using 5 cc of the 1% polymer solution in Example 'B', add 0.032 gram of 20% ammonium dichromate in distilled water. The solution is coated on a 75 mm × 50 mm glass slide, air dried and 30 minute ultra-violet irradiation cured. The cross-linked acrylamido sodium salt polymer coating was exposed to steam and found to be anti-fog.

(D) Repeat of 'C', except a 30 minute oven cure at 95° C for 30 minutes in lieu of ultra-violet irradiation cure. The cross-linked acrylamido sodium salt polymer is found to be anti-fog when exposed to steam.

EXAMPLE XXIV 4.5 Grams of 2-acrylamido-2-methyl propane sulfonic acid are dissolved in 6.5 cc of 4% ammonium persulfate in distilled water. Add 0.5 grams methyl methacrylate and 0.014 grams ethylene dimethacrylate in 1.0 cc, ethyl alcohol. The reaction solution is mixed until homogeneous and vacuum de-aired. Nitrogen is bubbled through the solution. A Pyrex ® glass dish and polystyrene dish are coated with the aforementioned solution and irradiated with strong ultra-violet rays for 10 minutes to initiate the polymerization. The Pyrex ® glass coated with the cross-linked acrylamido-methyl methacrylate co-polymer was post-cured in an oven for 30 minutes at 95° C and allowed to cool to room temperature.

The vinyl cross-linked acrylamido/methyl methacrylate co-polymer coated on polystyrene (without a post-cure) and Pyrex ® glass (with a post-cure) are hard and clear coatings and are tested with steam and found to be non-fogging.

EXAMPLE XXV

In a beaker, 3 grams 2-acrylamido-2-methyl propane sulfonic acid are dissolved in 4 cc of distilled water. Add 0.03 grams of ethylene dimethacrylate in 5 cc methyl alcohol; 2 cc gamma-aminopropyltriethoxysilane, and 5 cc of 4% ammonium persulfate in distilled water. The solution is mixed carefully as not to entrap any air and coated on (1) polystyrene plate and (2) Pyrex ® glass plate. The two plates are exposed to strong ultra-violet irradiation for 10 minutes to commence polymerizaton. The Pyrex ® glass, coated with the cross-linked acrylamido/amino-saline co-polymer is post-cured in an oven for 30 minutes at 95° C and a hard, clear film is formed. The co-polymer coated Pyrex ® glass and polystyrene are exposed to steam from a laboratory steam generator. A cross-linked acrylamido/silane co-polymer coated on glass or synthetic plastic are non-fogging.

EXAMPLE XXVI 5 cc of 1% linear acrylamido polymer (Example I) in methanol are mixed with 1 drop of myristic acid/chrome complex (A chrome complex of the Werner-type complexes in which fatty acids ($C_{14}$ to $C_{18}$) are coordinated with chromium (e.g. Quilon ®)) in isopropyl alcohol. The solution is coated on a glass slide, air dried, exposed to ultraviolet rays for 30 minutes and in an oven at 96° C for 30 minutes. The film is hard and clear. A linear acrylamido polymer, cross-linked with a chrome complex of a fatty acid, proved to be anti-fog.

EXAMPLE XXVII (A) 25 cc of 1% linear poly-2-acrylamido-2-methyl propane sulfonic acid, as described in Example I, in 70% ethyl alcohol / 30% water is mixed with 20 cc of a 1.3 percent solution of 3,4 epoxycyclohexylmethyl -

3,4 epoxycyclohexane carbonate in methyl alcohol. Four slides of glass are coated with the solution. Slide #1 is air dried at ambient temperature for 30 minutes. Slide #2 is air dried for 30 minutes and ultra-violet irradiated for 30 minutes. Slide #3 is air dried for 30 minutes and ultra-violet irradiated for 1 hour and 15 minutes. Slide #4 is air dried for 30 minutes and oven cured at 97° C for 30 minutes. All slides (#1-4) are tested with steam and are clear, hard and anti-fog.

(B) 0.02 grams of a 20% ammonium dichromate in water solution is added to 15 cc of above 'A' solution and coated on two glass slides. Slide #1 is air dried for 30 minutes at ambient temperature and slide #2 is air dried for 30 minutes and exposed to ultra-violet rays for 30 minutes. The two slides are tested with steam and the coating on both slides is clear, hard and anti-fog.

EXAMPLE XXVIII (A) 10 cc of a 1.3 percent methoxy methyl melamine in methyl alcohol is mixed with 10 cc of a one percent solution of linear 2-acrylamido-2-methyl propane sulfonic acid (see Example I) in ethyl alcohol. Two glass slides are coated with the polymer solution. Slide #1 is air dried at ambient temperature for 1 hour. Slide #2 is air dried for 1 hour and ultra-violet irradiated for 3 hours. The coating on both slides are clear and hard, when exposed to steam the coated slides are anti-fog.

(B) 0.02 Grams of 20% ammonium dichromate in water is added to 15 cc of the 'A' polymeric solution. Two glass slides are coated with the solution and both air dried at ambient temperatures for 1 hour. One of the glass slides is then exposed to ultra-violet rays for 3 hours. Both slides have a hard and clear coating. When exposed to steam both are anti-fog coatings.

While the invention has been illustrated with respect to particular polymers for use as anti-fog coatings it is apparent that variations and modifications can be made without departing from the scope of the invention.

What is claimed is:

1. An optical substrate having a surface thereof coated with a polymerized monomer of the formula:

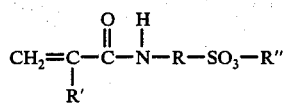

wherein R is selected from the group consisting of straight and branched alkane or alkylene of up to 10 carbon atoms, R' is selected from the group consisting of hydrogen and lower alkyl, and R" is a monovalent cation, the thus coated surface having anti-fog properties.

2. Coated optical substrate according to claim 1 wherein the monomer is polymerized as a linear polymer.

3. Coated optical substrate according to claim 1 wherein the monomer is polymerized and cross-linked into a three dimensional polymer.

4. Coated optical substrate according to claim 3 wherein the cross-linking agent is a vinyl compound.

5. Coated optical substrate according to claim 3 wherein the cross-linking agent is a metal salt or complex of a polyvalent metal.

6. Coated optical substrate according to claim 5 wherein said polyvalent metal is chromium.

7. Coated optical substrate according to claim 1 wherein said monomer is polymerized and formed into an interpolymer.

8. Coated optical substrate according to claim 7 wherein the interpolymer is formed by means of an epoxide.

9. Coated optical substrate according to claim 7 wherein said interpolymer is formed by means of a melamine.

10. Coated optical substrate according to claim 1 wherein said optical substrate is glass.

11. Coated optical substrate according to claim 10 wherein a chromic complex is incorporated as coupling agent for improved adhesion to said glass substrate.

12. Coated optical substrate according to claim 10 wherein a vinyl silane or amino silane is incorporated as a coupling agent for better adhesion to said glass substrate.

13. Coated optical substrate according to claim 1 wherein said optical substrate is a plastic.

14. Method of producing an anti-fog optical substrate according to claim 1, which comprises applying to the surface of an optical substrate a polymerized monomer of the formula:

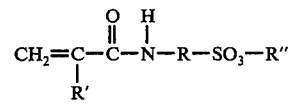

wherein R is selected from the group consisting of straight and branched alkane or alkylene of up to 10 carbon atoms, R' is selected from the group consisting of hydrogen and lower alkyl, and R" is a monovalent cation, thus forming a polymer coating on the surface which renders the surface anti-fog.

15. Method according to claim 14 wherein said monomer is polymerized as a linear polymer.

16. Method according to claim 14 wherein said monomer is polymerized and is cross-linked by means of a cross-linking agent.

17. Method according to claim 14 wherein said monomer is polymerized and formed to an interpolymer.

* * * * *